July 17, 1962  E. R. PRICE  3,044,449
PRESSURE MOTOR CONSTRUCTION
Original Filed April 21, 1958  2 Sheets-Sheet 1
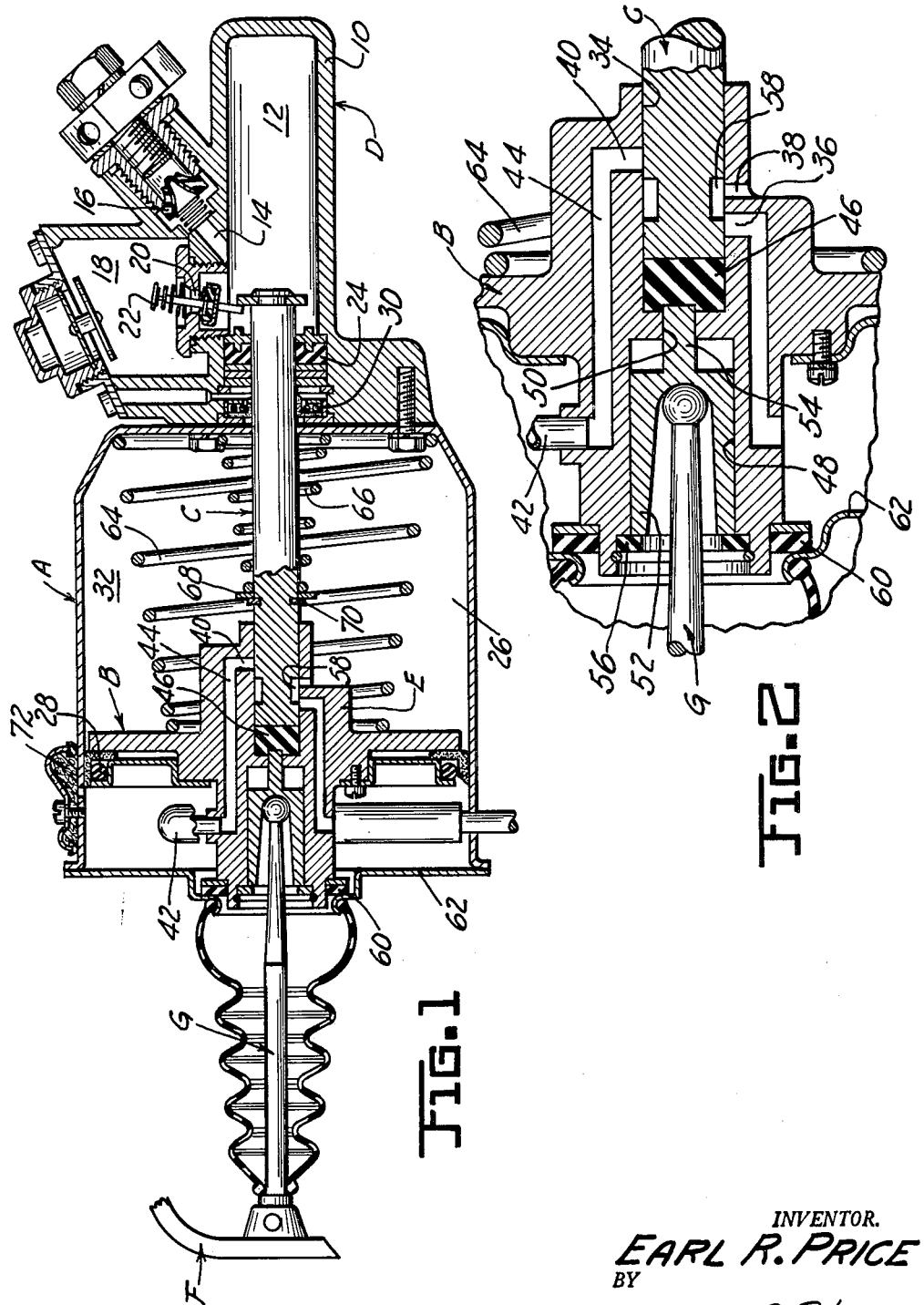
INVENTOR.
EARL R. PRICE
BY
William P. Hickey
ATTORNEY

INVENTOR.
EARL R. PRICE

United States Patent Office 3,044,449
Patented July 17, 1962

3,044,449
PRESSURE MOTOR CONSTRUCTION
Earl R. Price, South Bend, Ind., assignor to The Bendix Corporation, a corporation of Delaware
Continuation of abandoned application Ser. No. 729,853, Apr. 21, 1958. This application May 12, 1960, Ser. No. 28,740
12 Claims. (Cl. 121—38)

The present invention relates to fluid pressure servomotors; and more particularly to a simplified construction for fluid pressure servomotors of the type which produce a reactive force upon their control member which is generally proportional to the force being delivered by the fluid pressure servomotor.

The present invention is a continuation of my copending application Serial No. 729,853, filed April 21, 1958, now abandoned.

An object of the present invention is the provision of a new and improved fluid pressure servomotor of the above mentioned type which is simple in its construction, efficient and reliable in its operation, and is inexpensive to manufacture.

The invention resides in certain constructions and combinations are arrangements of parts; and further objects of the invention will become apparent to those skilled in the art to which the invention relates from the following description of the preferred embodiment described with reference to the accompanying drawings forming a part of the specification, and in which:

FIGURE 1 is a cross sectional view of a fluid pressure servomotor embodying principles of the present invention;

FIGURE 2 is a fragmentary cross sectional view of the control structure of the fluid pressure motor shown in FIGURE 1;

Figure 3:
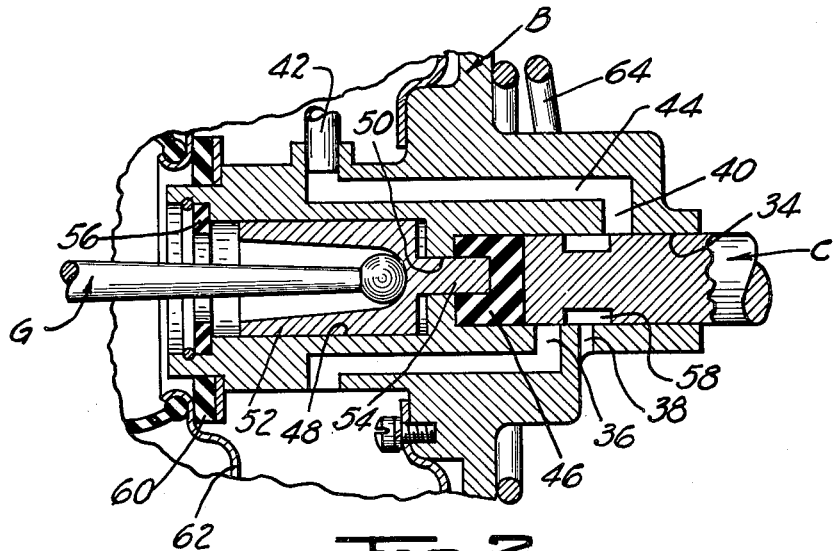
FIGURE 3 is a fragmentary cross sectional view of the control structure similar to that of FIGURE 2 but showing the structure as it occurs at the beginning of its power actuation of the servomotor.

The fluid pressure servomotor shown in FIGURE 1 is part of a power operated master cylinder of the type used to actuate the hydraulic braking systems of automotive vehicles. The power operated master cylinder shown in FIGURE 1 generally comprises a servomotor housing A having a movable wall B therein which is adapted to force a force transmitting member or fluid displacement member C into a hydraulic cylinder D which is affixed to one end wall of the servomotor housing A. The unit is controlled by a control valve structure E mounted in the movable wall B, which control valve structure is operated by a foot pedal lever F through an interconnecting push rod G.

The master cylinder D comprises a casting 10 having a longitudinally extending fluid pressure chamber 12 therein from which fluid is discharged through an angularly upwardly extending passageway 14 having a conventional residual pressure check valve 16 therein for holding a slight amount of residual pressure on the hydraulic braking system actuated by the unit. The master cylinder D also includes a reservoir chamber 18 that is positioned above the fluid pressurizing chamber 12, and which communicates with the fluid pressurizing chamber 12 through a compensating passageway 20. Flow through the passageway 20 is controlled by a conventional check valve structure 22 which normally prevents flow from the fluid pressurizing chamber 12 to the reservoir 18, but which opens the passageway during the deenergized condition of the master cylinder D.

As previously indicated, the casting 10 is bolted to the front end of the fluid pressure servomotor housing A, and the axially extending fluid displacement member C projects into the adjacent end of the fluid pressure chamber 12. A suitable pressure sealing structure 24 effects a seal between the displacement member C and the sidewalls of the fluid pressure chamber 12, and the end of the fluid displacement member C that is positioned in the fluid displacement chamber D is provided with a radially extending flange which engages the bottom end of the tilt valve structure 22 to open the tilt valve structure during the deenergized condition of the unit wherein the fluid displacement member C is in its retracted position. For a more complete understanding of the construction and operation of the master cylinder portion of the unit so far described, reference may be had to the Edward E. Hupp Patent No. 2,864,632.

As previously indicated the servomotor portion of the power operated master cylinder shown in the drawings comprises a movable wall or piston B, positioned in a fluid pressure chamber 26 of the servomotor housing A, for forcing the fluid displacement member C into the hydraulic pressurizing chamber 12. The servomotor unit shown in the drawing is of the normally atmospheric submerged type, which is adapted to be power actuated by vacuum from the manifold of the propelling engine of the vehicle upon which the unit is mounted. The outer periphery of the piston is provided with a suitable vacuum seal 28, and another vacuum seal 30 is provided between the fluid displacement member C and the sidewalls of the hydraulic pressurizing chamber 12 so that the unit will be power actuated when vacuum is communicated to the power chamber 32 that is positioned between the front face of the piston B and the hydraulic cylinder D. The servomotor unit is also of the type which produces a reaction force upon the foot pedal lever F which force is smaller than and generally proportional to the force being transmitted to the fluid displacement member C during actuation of the unit; and according to principles of the present invention, a marked simplification in servomotor construction is provided by the reaction valving construction about to be described.

The reaction producing control valve structure E shown in the drawing is formed by means of a cylindrically axially extending reaction and slide valve chamber 34 which opens into the front face of the piston B, and into which the rear end of the fluid displacement member C projects. The sidewalls of the slide valve chamber 34 are provided with an atmospheric port 36 which communicates with the rear face of the piston B, a control port 38 which communicates with the power chamber 32, and a vacuum port 40 to which manifold vacuum is communicated through the flexible connection 42 and piston passage 44—the ports being spaced apart in that order proceeding in a forwardly direction. A body of pressure deformable material, which in the present instance is a block of synthetic rubber 46, is positioned between the rear end of the slide valve chamber 34 and the rear face of the fluid displacement member C; and a control bore 48 having a portion 50 which is of smaller cross section than the slide valve chamber 34 opens into the bottom end of the chamber 34 and communicates the chamber 34 with the rear end of the power piston B. As shown in the drawing the rear end of the control bore 48 is counterbored to receive a cylindrical control member 52 which is provided with an axially extending projection or boss 54 that projects into the small diameter portion 50 for abutment wtih the block of rubber 46. The rear end of the control bore 48 is provided with a suitable nonmetallic stop 56 to prevent complete retraction of the control member 52 during the released condition of the servomotor; and when the control member 52 is in its retracted position against the stop member 56, the forward end of the boss 54 will be held in engagement with the block of rubber 46.

The control valve structure is completed by an annular recess 58 in the outer periphery of the portion of the fluid displacement member C positioned in the slide valve chamber 34—which recess 58 has an axial dimension which is slightly less than the axial spacing of the atmospheric and vacuum ports 36 and 40. The annular recess 58 is so positioned lengthwise of the fluid displacement member C so as to be in communication with the atmospheric port 36 when the fluid displacement member C is in abutment with the block 46; and the block 46 is in turn in abutment with the rear end of the slide valve chamber 34, and substantially no force is being transmitted between the fluid displacement member C and the piston B which will deform the rubber block 46 into the portion 50 of the control bore 48. The power piston B is biased rearwardly into its retracted position wherein the rubber bumper 60 on the rear end thereof abuts the rear cover plate 62 of the servomotor housing A by a coil spring 64 positioned between the front face of the piston B and the forward end of the servomotor housing A; and the fluid displacement member C is biased into its above described position wherein it produces a deenergization of the servomotor by another coil spring 66 positioned between the front end of the servomotor housing A and an abutment washer 68 suitably affixed to the fluid displacement member C by a snap ring 70.

The servomotor unit shown in the drawing is placed into operation by a depressing of the foot pedal lever F; whereupon the push rod G forces the control member 52 forwardly to in turn move its projection 54 into the block of rubber 46 to pressurize this pressure deformable body and in turn cause the fluid displacement member C to be moved forwardly sufficiently to move the rear edge of the annular recess 58 out of engagement with the atmospheric port 36; and to thereafter move the front edge of the recess into communication with the vacuum port 40. Vacuum from the manifold of the vehicle's propelling engine will thereupon be communicated to the power chamber 32, to cause a pressure differential to be produced across piston B; inasmuch as atmospheric pressure is continually communicated to the rear face of the piston B through the air filter 72. Differential pressure across the power piston B causes the piston to move forwardly to compress spring 64, and in turn cause forward telescopic movement of the piston B over the rear end of the fluid displacement member C and thereby close off the vacuum port 40. At the same time, forward movement of the piston B relative to the fluid displacement member C produces a fluid pressurizing of the rubber block 46 which biases the boss 54 of the control member 52 rearwardly should the operator not increase the force being applied to the foot pedal lever F. If the operator desires to increase the braking effort being produced by the power operated master cylinder, a further increase in force upon the foot pedal lever F will cause the projection 54 of the control member to again move into the rubber block 46 to cause the fluid displacement member C to again move forwardly relative to the power piston B and the recess 58 to again communicate with the vacuum port 40. This will in turn produce further forward movement of the power piston B to force the fluid displacement member C further into the hydraulic chamber 12 and thereby cause additional fluid to be delivered to the braking system of the vehicle.

When further increase in force on the foot pedal lever F by the operator is stopped, an increase in pressure differential across the power piston B will continue long enough to move the power piston B forwardly relative to the fluid displacement member C sufficiently to move the vacuum port 40 forwardly out of communication with the recess 58 and thereby prevent further forward movement of the power piston B. When it is desired to release the braking effort being developed by the power operated unit, a reduction of the force applied to the foot pedal lever F will cause the internal pressure of the block of rubber 46 to bias the projection 54 of the control member 52 rearwardly sufficiently to permit the fluid displacement member C to move rearwardly relative to the power piston B, and thereby bring the recess 58 into communication with the atmospheric port 36. Differential pressure across the power piston B will thereupon be reduced, so that the force exerted by the fluid displacement member C and the piston return spring 64 will move the piston rearwardly. When further retraction of the foot pedal lever F is stopped, the power piston B will move rearwardly relative to the fluid displacement member C sufficiently to move the atmospheric port 36 out of communication with the recess 58. A complete retraction of the foot pedal lever F, will of course, permit the recess 58 to stay in communication with the atmospheric port 36, and the power piston B to again assume the retracted position shown in FIGURE 1 of the drawings.

During the above described operation, the block of rubber 46 behaves much in the same manner as a body of liquid wherein force applied to one face of the liquid is distributed as a pressure which is exerted in substantially all directions. The behaviour of the body of deformable material, which in the present instance is a block of rubber, permits a proportioning of reactive force upon the control member 52 which at all times is generally proportional to the ratio of the cross sectional area of the projection 54 with respect to the cross sectional area of the fluid displacement member C. This will be particularly true with a soft grade of rubber, as for example a gum rubber; and the ratio of the reactive force applied to the control member to the force being exerted against the fluid displacement member C can be made to increase in the construction previously described, with the use of a rubber having greater rigidity, as evidenced by higher durometer readings. This is true, inasmuch as in the construction previously described, the projection 54 of the control member moves inwardly relative to the rear face of the slide valve chamber 38 during actuation of the unit to cause a bridging action or separation of the rear face of the rubber from the end wall of the slide valve chamber 34 as the projection 54 is moved forwardly. This bridging effect can be varied as desired by the use of pressure deformable materials having differing amounts of rigidity. Where it is desired to eliminate all bridging action, a body 46 of pressure deformable material having very little rigidity can be used, and the strength of the coil spring 66 can be increased sufficiently to cause the body of deformable material 46 to be forced inwardly into the passage 50 at all times. With such an arrangement, the projection 54 will, of course, be foreshortened to permit the body of deformable material to be extruded into the passage 50. In this latter arrangement, the shifting of the slide valve structure C will be produced with the inner face of the body of deformable material 46 always falling within the passageway 50; so that the bridging effect previously described will be substantially eliminated.

Figure 4:
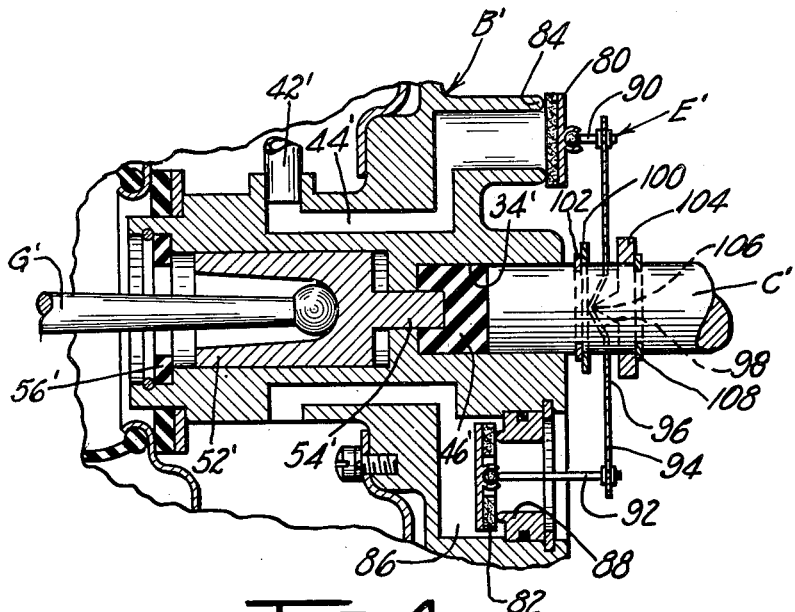
FIGURE 4 is a fragmentary cross sectional view of another embodiment of control valve structure, showing the structure in its lapped position.

The embodiment shown in FIGURE 4 of the drawings utilizes certain of the reaction principles of the present invention, and differs from the previously described embodiment principally in that a different type of valving structure is used. Those portions of FIGURE 4 which are substantially identical with those of the previously described embodiment will be identified by a like reference numeral characterized further in that a prime mark is affixed thereto. The control valve structure E' of the present embodiment utilizes a vacuum poppet 80 and an atmospheric poppet 82 which are spaced apart on opposite sides of the force transmitting member C'. The vacuum poppet 80 is adapted to cooperate with a forwardly facing atmospheric valve seat 84 formed integrally in the front face of the power piston or movable wall B' and to which valve seat the vacuum passage 44' communicates. The atmospheric poppet 82 is positioned in an atmospheric chamber 86, and is adapted to cooperate with a rearwardly extending atmospheric valve seat member 88 suitably sealed and affixed in the front face of the power piston B'. Each of the poppets 80 and 82 are provided with a socket for receiving the ball shaped end of the pins 90 and 92, respectively, and the pins 90 and 92 are suitably affixed to opposite ends of a walking beam 94. The walking beam 94 has an annular center portion 96 which surrounds the force transmitting member C'. Opposite sides of the center portion 96 are bent rearwardly to provide crowned portions 98, only one of which is shown, for pivotal abutment with a washer 100 that is retained on the force transmitting member C' by a snap ring 102. The crowned portions 98, are held in pivotal abutment with the washer 100 by means of a retaining washer 104 having knife edge projections 106 on opposite sides of the force distribution member C'. The knife edge portions 106 are received in the valleys of the crown portions 98 to hold the crown portions 98 of the walking beam into engagement with the abutment washer 100. A suitable snap ring 108 is provided for retaining the washer 104 in position.

Operation of the embodiment shown in FIGURE 4 is dependent upon the same relative movement between the force transmitting member C and power piston B as described for the embodiment shown in FIGURES 1, 2 and 3. Forward movement of the control member 52' causes its projection 54' to either deform or push the block of rubber 46' forwardly, as the case may be; and thereby force the force transmitting member C' forwardly relative to the movable wall B'. In the normal deactuated position of the servomotor, the atmospheric poppet 82 will be positioned rearwardly out of engagement with the atmospheric valve seat 88. The forward movement of the control member 52' previously described, causes the atmospheric poppet 82 to abut the atmospheric valve seat 88 and thereby assume the position shown in FIGURE 4. Further forward movement of the control member 52' causes further relative movement of the force transmitting member C' forwardly of the power piston B' to thereby cause the walking beam 94 to pivot about the atmospheric valve seat 88 and lift the vacuum valve poppet 80 out of engagement with the vacuum valve seat 84. Pressure in the forward chamber 32 will thereby be decreased to produce a pressure differential across the movable wall B' causing the movable wall B' to move forwardly and thereby compress the block of rubber 46' between the movable wall B' and force transmitting member C'.

When the operator stops his forward movement of the push rod G', the movable wall B' will move forwardly a sufficient amount relative to the control member 52' to bring the vacuum valve seat 84 into engagement with the vacuum poppet 80 thereby preventing further increase in the pressure differential across the movable wall B'. In this position the block of rubber 46' is compressed between the movable wall B', the force transmitting member C' and the control rod portion 54' so as to develop an internal pressure generally proportional to the force being applied to the force distribution member C'. When the operator desires to decrease the braking effort, a slight retraction of the push rod G' permits the rubber 46' to push the portion 54' of the control member 52' rearwardly. As the portion 54' of the control member 52' moves rearwardly, rearwardly directed force being applied to the force transmitting member C' causes the rubber block 46' to follow the portion 54' and thereby permit rearward movement of the force transmitting member C' relative to the movable wall B'. This rearward movement of the force transmitting member C' is applied to the center portion of the walking beam 94 by means of the abutment washer 104 which thereby causes the walking beam to pivot about the vacuum poppet 80 and thereby lift the atmospheric poppet 82 out of engagement with the atmospheric valve seat 88. Flow of air into the forward chamber 32 decreases the pressure differential across the movable wall B' thereby causing the movable wall B' to move rearwardly in the same manner as described for the previous embodiment. Complete retraction of the push rod G' permits the control member 52' to abut the stop member 56'—in which position the end of the projection 54' is generally flush with the end of the reaction chamber 34' and the atmospheric valve poppet 82 is held out of engagement with the atmospheric valve seat 88.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a fluid pressure servomotor: a body member having a fluid pressure chamber therein extending generally lengthwise thereof; a movable wall member in said fluid pressure chamber, said movable wall member having a slide valve chamber therein; a force transmitting member one portion of which is slidably positioned in said slide valve chamber; abutment surfaces on said force transmitting member and said movable wall member which surfaces face each other; a body of deformable material confined between said abutment surfaces, said deformable material having the property of developing internal pressure forces therein which act in substantially all directions when compressive force is applied thereto; cooperating slide valve porting in the concentric portions of said force transmitting member and sidewalls of said slide valve chamber for producing a pressure differential across said movable wall member said porting being arranged so that when said abutment surfaces are spaced apart a normal generally predetermined distnce substantially no change in pressure differential across said movable wall member will be produced, so that when said abutment surfaces are moved further apart than said normal predetermined distance a pressure differential will be produced across said movable wall member tending to force said abutment surfaces together, and so that when said abutment surfaces are spaced closer than said generally predetermined distance a reduction in pressure differential across said movable wall member is produced; and control means projecting through an opening in one of said members into engagement with said body of deformable material for pressurizing said deformable material to force said abutment surfaces apart and thereby actuate said slide valve porting.

2. In a fluid pressure servomotor: a body member having a fluid pressure chamber therein extending generally lengthwise thereof; a movable wall member in said fluid pressure chamber, said movable wall member having a slide valve chamber therein; a force transmitting member one portion of which is slidably positioned in said slide valve chamber; abutment surfaces on said force transmitting member and said movable wall member which surfaces face each other; a body of rubber-like material confined between said abutment surfaces, said rubber-like material having the property of developing internal pressure forces therein which act in substantially all directions when compressive force is applied thereto; cooperating slide valve porting in the concentric portions of said force transmitting member and sidewalls of said slide valve chamber for producing a pressure differential across said movable wall member, said porting being arranged so that when said abutment surfaces are spaced apart a normal generally predetermined distance substantially no change in pressure differential across said movable wall member will be produced, so that when said abutment surfaces are moved further apart than said normal predetermined distance a pressure differential will be produced across said movable wall member tending to force said abutment surfaces together, and so that when said abutment surfaces are spaced closer than said generally predetermined distance a reduction in pressure differential across said movable wall member is produced; and control means projecting through an opening in one of said members into engagement with said body of rubber-like material for pressurizing said rubber-like material to force said abutment surfaces apart and thereby actuate said slide valve porting.

3. In a fluid pressure servomotor: a housing having a fluid pressure chamber therein extending generally lengthwise thereof, a movable wall in said fluid pressure chamber, said movable wall having a valve chamber therein opening outwardly of one end face of said movable wall and extending generally lengthwise of said fluid pressure chamber, a force transmitting member one end of which is positioned in said valve chamber for transferring abutting force from said movable wall to said force transmitting member when said movable wall is forced in the direction of said force transmitting member, a body of deformable material positioned between the inner end of said valve chamber and the end of said force transmitting member positioned in said valve chamber, said deformable material having the property of developing internal pressure forces therein which act in substantially all directions when compressive force is applied thereto, control structure extending generally lengthwise from the opposite end face of said movable wall into the inner end of said valve chamber for abutment with said body of deformable material, and cooperating valve porting in the sidewalls of said valve chamber and said end of said force transmitting member positioned in said valve chamber for producing a pressure differential across said movable wall which forces it in the direction of said force transmitting member when said force transmitting member is moved in said mentioned direction by abutting force of said control structure upon said body of deformable material.

4. In a fluid pressure servomotor: a housing having a fluid pressure chamber therein extending generally lengthwise thereof; a movable wall member in said fluid pressure chamber; said movable wall member having a valve chamber therein opening outwardly of one end face of said movable wall member and extending generally lengthwise of said fluid pressure chamber; a force transmitting member one end of which is positioned in said valve chamber for transferring abutting force from said movable wall member to said force transmitting member when said movable wall member is forced in the direction of said force transmitting member; a body of deformable material positioned between the inner end of said valve chamber and the end of said force transmitting member in said valve chamber; said deformable material having the property of developing internal pressure forces therein which act in substantially all directions when compressive force is applied thereto; a control structure extending generally lengthwise from the opposite end face of said movable wall member into the inner end of said valve chamber for abutment with said body of deformable material; and cooperating slide valve porting in the concentric portions of said force transmitting member and the sidewalls of said valve chamber for producing a pressure differential across said movable wall member; said porting being arranged so that when said members are in a predetermined axial position relative to each other, substantially no change in differential pressure is produced across said movable wall member; so that when said members are moved outwardly relative to each other from said normal position, a pressure differential will be produced across said movable wall member tending to force said members together; and so that when said force transmitting member is moved inwardly into said valve chamber from said normal position, a reduction in differential pressure is produced across said movable wall member.

5. In a fluid pressure servomotor: a body member having an axially extending fluid pressure chamber therein; a movable wall in said fluid pressure chamber, said movable wall forming a contractible and expansible power chamber in the forward end of said fluid pressure chamber, and said movable wall having an axially extending slide valve chamber opening into said power chamber; a force transmitting member one end of which is slidably positioned in said slide valve chamber; a body of deformable material confined between the end of said force transmitting member and the bottom end of said slide valve chamber; said movable wall also having an axially extending opening communicating the bottom end of said slide valve chamber with the rear face of said movable wall, the portion of said second mentioned axially extending opening, opening into said valve chamber being of a cross section smaller than the cross section of said slide valve chamber; a control member projecting through said second mentioned axially extending chamber for abutment with said body of deformable material; said movable wall having a high pressure port, a control port, and a low pressure port spaced apart forwardly in that order in the sidewalls of said slide valve chamber forwardly of said body of deformable material; said force transmitting member having a normal position in said slide valve chamber wherein substantially no force is transmitted from said movable wall to said force transmitting member through said deformable body; and said force transmitting member having a recess in its outer periphery for communicating said ports, said recess having an axially extending length which is slightly less than the distance separating said high and low pressure ports.

6. In a fluid pressure servomotor: a body member having an axially extending fluid pressure chamber therein; a movable wall in said fluid pressure chamber, said movable wall forming a contractable and expansible power chamber in the forward end of said fluid pressure chamber, and said movable wall having an axially extending slide valve chamber opening into said power chamber; a force transmitting member one end of which is slidably positioned in said slide valve chamber; a body of deformable material confined between the end of said force transmitting member and the bottom end of said slide valve chamber; said movable wall also having an axially extending opening communicating the bottom end of said slide valve chamber with the rear face of said movable wall, the portion of said second mentioned axially extending opening, opening into said slide valve chamber being of a cross section smaller than the cross section of said slide valve chamber; a control member projecting through said second mentioned axially extending chamber for abutment with said body of deformable material; means continually communicating atmospheric pressure with the rear face of said movable wall, said movable wall having a high pressure port continually communicating with the rear face of said movable wall, a control port continually communicating with said power chamber, and a vacuum port spaced apart forwardly in that order in the sidewalls of said slide valve chamber forwardly of said body of deformable material; said force transmitting member having a normal position in said slide valve chamber wherein substantially no force is transmitted from said movable wall to said force transmitting member through said deformable body; and said force transmitting member having a recess in its outer periphery for communicating said ports, said recess having an axially extending length which is slightly less than the distance separating said atmospheric and vacuum ports.

7. In control mechanism for a servomotor: a power actuated member, a driven member, one of said members having an opening into which the other projects to close off said opening, a body of deformable material in said opening and confined between said power actuated and driven members, said deformable material having the property of developing internal pressure forces therein which act in substantially all directions when compressive force is applied thereto, a control member slidable in one of said members and having a portion extending into said opening to abut and pressurize said body of deformable material, said portion being of smaller cross section than said opening, and control means actuated by movement of said driven member away from said power actuated member for increasing the force applied to said driven member by said power actuated member.

8. In control mechanism for a fluid pressure servomotor: a fluid pressure driven movable wall member, a second driven member, one of said members having an opening into which the other projects to close off said opening, a body of deformable material in said opening and confined between said movable wall and second driven members, said deformable material having the property of developing internal pressure forces therein which act in substantially all directions when compressive force is applied thereto, a control member slidable in one of said members and having a portion extending into said opening to abut and pressurize said body of deformable material, said portion being of smaller cross section than said opening, and control valve means actuated by movement of said second driven member away from said fluid pressure driven movable wall member for increasing the force applied to said second driven member by said fluid pressure driven in movable wall member.

9. In a control valve: a body member having an axially extending generally cylindrical chamber that is open at one end and closed at the other, a cylindrical member generally closing off said chamber, a body of deformable material confined between said cylindrical member and the closed end of said chamber, said deformable material having the property of developing internal pressure forces therein which act in substantially all directions when compressive force is applied thereto, a control member projecting into said chamber to pressurize and displace said body of deformable material to move said cylindrical member, said cylindrical member and sidewalls of said chamber having slide valve porting therein that is controlled by their relative positions and including a control port whose internal pressure is to be controlled, means causing said cylindrical member to be forced into said chamber with a force which is a generally predetermined function of the pressure in said control port, and said slide valve porting being arranged to increase said force when said control member is moved into said chamber to move said cylindrical member outwardly of said chamber and to reduce said force when said control member is moved outwardly of said chamber, and whereby the pressure in said control port is effectively controlled.

10. In a control valve: a body member having an internal chamber with an axially extending cylindrical sidewall portion, a cylindrical member having a normal position in said cylindrical sidewall portion and projecting outwardly from one end thereof, an axially positioned control member projecting from the other end of said body member, a body of elastomeric material positioned between said control member and said cylindrical member so that movement of said control member against said elastomeric material causes said cylindrical member to slide outwardly of said one end of said internal chamber, valve structure having a control port which is communicated to a first source of pressure when said cylindrical member is moved outwardly from its normal position and which is communicated to a second source of pressure when moved inwardly of said normal position, and means causing said cylindrical member to be biased inwardly with a force which increases in intensity as the pressure in said control port approaches that of said first pressure source.

11. In a control valve: a body member having an axially extending stepped chamber having large diameter and small diameter sections with a shoulder in between, a body of pressurizable elastomeric material positioned in said large diameter section with one end face adjacent said shoulder, a piston in said large diameter section of said chamber adjacent the face of said body of pressurizable material opposite said shoulder, said piston having a normal position in said chamber relative to said shoulder, an actuating plunger in said small diameter section for insertion into said body of pressurizable material to pressurize said material and move said piston out of its normal position in the direction away from said shoulder, and control valve means actuated by said piston for increasing the discharge pressure of said control valve means when said piston is moved out of its normal position away from said shoulder by said body of pressurizable material, and whereby said control valve means is actuated by a force greater than the actuating force exerted on said actuating plunger.

12. In a control mechanism: a body member having an internal chamber surrounded by sidewalls which include a movable wall having a normal position in said chamber from which it is movable outwardly of said chamber in a given direction, a body of semi-rigid pressurizable material in said chamber, said sidewalls of said chamber having an opening therein whose cross sectional area is less than that of said movable wall, an actuating plunger projecting into said chamber against said pressurizable material for pressurizing said material and thereby moving said movable wall outwardly of said chamber from said normal position, and control means actuated by said movable wall for regulating a flow of energy, said control means producing a force on said movable wall against said body of pressurizable material when said movable wall is held outwardly of its normal position, and whereby said control means is actuated by a force greater than the actuating force exerted on said actuating plunger.

No references cited.